United States Patent [19]

Millan

[11] Patent Number: 5,383,747
[45] Date of Patent: Jan. 24, 1995

[54] SYSTEM FOR TREATING A SUBTERRANEAN FORMATION HAVING AN AQUIFER CONTAMINATED WITH ORGANICS

[75] Inventor: Rudolph R. Millan, Berkeley, Calif.

[73] Assignee: International Technology Corporation, Torrance, Calif.

[21] Appl. No.: 110,442

[22] Filed: Aug. 23, 1993

[51] Int. Cl.6 .............................................. B09B 3/00
[52] U.S. Cl. ................................. 405/128; 166/370; 210/751; 405/52
[58] Field of Search .................. 405/128, 129, 52, 53, 405/58; 166/370, 50; 210/747, 751

[56] References Cited

U.S. PATENT DOCUMENTS

| | | | |
|---|---|---|---|
| 4,323,122 | 4/1982 | Knopik | 166/267 |
| 4,345,647 | 8/1982 | Carmichael | 166/370 X |
| 4,435,292 | 3/1984 | Kirk et al. | 210/747 |
| 5,018,576 | 5/1991 | Udell et al. | 166/272 |
| 5,050,676 | 9/1991 | Hess et al. | 166/370 X |
| 5,067,852 | 11/1991 | Plunkett | 405/128 |
| 5,095,975 | 3/1992 | Bernhardt | 166/370 X |
| 5,115,866 | 5/1992 | Corte et al. | 166/370 |
| 5,116,163 | 5/1992 | Bernhardt | 405/128 |
| 5,154,538 | 10/1992 | Böckle | 405/128 |
| 5,161,914 | 11/1992 | Rahn | 405/128 |
| 5,169,263 | 12/1992 | Johnson et al. | 405/128 |
| 5,171,103 | 12/1992 | Bernhardt | 405/128 |
| 5,271,693 | 12/1993 | Johnson et al. | 405/128 |

OTHER PUBLICATIONS

Authors: Robert M. Conger & Keith Trichel Title: "A Groundwater Pumping Application for Remediation of a Chlorinated Hydrocarbon Plume with Horizontal Well Technology" Publication: BASF Corporation/Eastman Christensen Environmental Systems Geismar, Louisiana/Houston, Tex.

Author: Haraldur Karlsson Title: "Horizontal Systems Technology for Shallow-Site Remediation" Publication: Journal of Petroleum Technology.

Authors: Steven B. Blake & Michael M. Gates Title: "Vacuum Enhanced Hydrocarbon Recovery: A Case Study" Publication: National Water Well Association.

Author: David D. Wilson, Dawn S. Kabak and Daniel B. Oakley Title: "Horizontal Environmental Wells".

Author: Dawn S. Kabak, Brian B. Looney, Carol A. Eddy & Terry C. Hazen Title: "Innovative Ground Water & Solid Remediation: In Situ Air Stripping Using Horizontal Wells" Publication: Westinghouse Savannah River Company Abstract.

Authors: R. C. Speake, Jr., M. Trojan & Z. Z. Wang Title: "Modeling the Performance of a Horizontal Groundwater Recovery Well" Publication: K. W. Brown & Associates, Inc. at the 5th National Outdoor Action Conference held May 13, 1991–May 16, 1991.

*Primary Examiner*—Dennis L. Taylor
*Attorney, Agent, or Firm*—Luedeka, Neely & Graham

[57] ABSTRACT

The specification discloses a system for treating a subterranean formation having an aquifer contaminated with organics wherein organics are removed from the formation through an extraction well and a negative pressure is supplied to the formation through a vacuum well to cause an influx of water into the formation which is selected so that the water level is maintained at a desired level.

10 Claims, 5 Drawing Sheets

Fig. 1

_Fig_.3

_Fig_.4a

_Fig_.4b

_Fig_.4c

SYSTEM FOR TREATING A SUBTERRANEAN FORMATION HAVING AN AQUIFER CONTAMINATED WITH ORGANICS

This invention relates generally to the removal of organic contaminants from a subterranean formation. More particularly, the present invention relates to a system for treating a subterranean formation having an aquifer contaminated with organics which enables control of the water level of the aquifer for improved removal of organics from the formation.

Aquifers are generally characterized within a subterranean formation as a water table at some level below the ground surface with a capillary fringe region of varying depth overlying the water table. A vadose zone or unsaturated area often extends between the capillary fringe and the ground surface and a very low permeability zone known as an aquitard is often present below the water table.

Organic contamination of aquifers has become a topic of much environmental concern and great effort has been expended toward the removal of organic contaminants from subterranean formations. These contaminants are typically classified with regard to whether they float on water or sink. Contaminants which float are sometimes referred to as light non-aqueous phase liquid ("LNAPL") contaminants and those which sink are generally referred to as dense non-aqueous phase liquid ("DNAPL") contaminants. Typically, LNAPL contaminants are found floating on the water table and to some extent may be present in the capillary fringe as well as the vadose zone. DNAPLs are usually found trapped within depressions in an upper surface of the aquitard below the aquifer, although these contaminants may also be distributed to other areas of the formation.

It is known that LNAPLs may be removed from a contaminated formation by drilling a vertical well to a location adjacent the water level and extracting the LNAPLs through the well in a skimming-type operation. It is also known that DNAPLs may be removed from a contaminated formation by drilling a vertical well into the formation to the depth of the DNAPLs and extracting the DNAPLs through the well.

Known methods for extracting LNAPLs from the top of a water table suffer from various disadvantages including a tendency to cause the level of the aquifer to fluctuate appreciably as the liquid adjacent the well is removed. These fluctuations in the water level tend to cause LNAPLs to "smear" onto the formation and cling to interstitial surfaces of the formation so that they are difficult to extract. Also, the sharp "cone-of-depression" adjacent the lower end of a vertical extraction well may pull LNAPLs down into the area of the formation contaminated with DNAPLs. This may result in the formation of emulsions which may be difficult to extract from the formation.

Accordingly it is an object of the present invention to provide an improved method for removing organics from a subterranean formation.

Another object of the present invention is to provide an improved method for removing LNAPLs from a subterranean formation having an aquifer.

A further object of the present invention is to provide a method of the character described which minimizes fluctuation of the water table during removal of LNAPLs from the formation.

An additional object of the present invention is to provide a method of the character described which avoids the formation of undesirable LNAPL/DNAPL emulsions in an aquifer.

It is another object of the present invention to provide a method of the character described which enables the level of an aquifer to be controlled to enhance removal of LNAPLs from the aquifer and to avoid excessive smearing of LNAPLs.

A still further object of the present invention is to provide a method of the character described which enables liquids to be removed from an aquifer without an associated drop in the water level of the aquifer.

Yet another object of the present invention is to provide a method of the character described which enables the water level of an aquifer to be maintained at a desired level to facilitate removal of LNAPLs from the aquifer.

Yet another object of the present invention is to provide a method for establishing and maintaining a desired level of the water table adjacent a liquid withdrawal well extracting LNAPLs from an aquifer.

Still another object of the present invention is to provide a method of the character described which is uncomplicated in application.

Having regard to the foregoing and other objects, the present invention is directed to a method for treating a subterranean formation including an aquifer having a water table having an upper surface spaced below the ground surface and organic contaminants in the form of LNAPLs adjacent the upper surface of the aquifer. In accordance with the invention, LNAPLs are removed from the formation as by direct pumping from a location adjacent the surface of the water table using a horizontal extraction well, which tends to lower the position of a desired upper level of the adjacent water table. A force is applied to the water table as by application of a vacuum to the formation adjacent to and above the point of removal of the LNAPLs to cause the water table to remain at the desired level so that LNAPLs may be removed from the water table with the water table remaining substantially at the desired level.

An advantage of the present invention, wherein the water table is maintained at a desired level is the avoidance of unnecessary variations of the water table. This minimizes smearing of LNAPLs onto the formation which is a persistent problem with conventional removal techniques. In addition, the use of a horizontal LNAPL removal well is advantageous to avoid the formation of a cone-of-depression and its deleterious effects.

In a preferred embodiment, negative pressure is applied to the formation during removal of LNAPLs by a horizontal vacuum well located adjacent to and above the upper level of the aquifer. The vacuum well applies a lift force to the adjacent upper surface of the water table and, thus, serves to increase the influx of water into the formation so that the water level may be maintained at a desired level to avoid smearing of LNAPLs. In addition, the lift force may provide the added benefit of increasing production of the LNAPL well.

These and other features and advantages of the invention will now be further described in the following specification with reference to the accompanying drawings in which:

Figure 1:
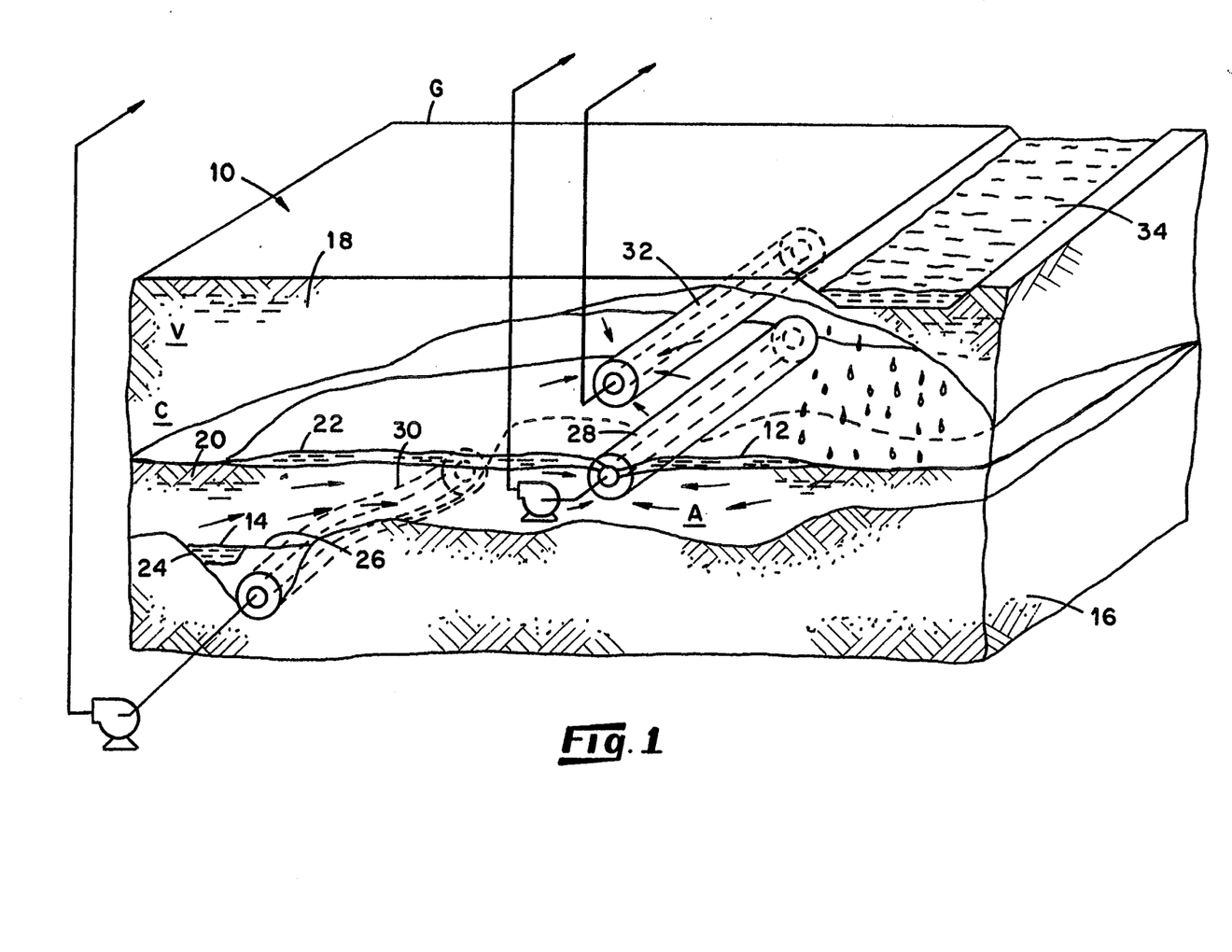
FIG. 1 is a diagrammatic view illustrating various features of the present invention for treating a subterranean formation.

With reference now to the drawings in further detail wherein the reference characters designate like or similar parts throughout the several views, the more general features of the invention are illustrated in the diagrammatic view of FIG. 1 wherein a subterranean formation generally indicated at 10 is contaminated by the presence of organic contaminants in the form of LNAPLs in area 12 and DNAPLs in area 14.

For example, the formation 10 may be characterized by low transmissivity clays from ground surface G down to about 10 feet, with a relatively permeable water bearing stratum or aquifer A down to approximately 25 feet, followed by a very low permeability aquitard 16 having a thickness of about 10 feet. The low transmissivity clays above the aquifer define a capillary fringe region C of varying depth overlying the aquifer and a vadose zone or unsaturated area V extending between the capillary fringe region C and the ground surface G. The above dimensions are only exemplary, as the depth and configuration of various portion of the formation will vary widely from site to site.

The aquifer A may include an upper water saturated zone 18 having a thickness of about 6 feet and a lower saturated zone 20. As encountered in the field, the LNAPLs may be present as a layer floating adjacent an upper surface 22 of the water level in the saturated zone 18 of the aquifer A and to some extent LNAPLs may be present in the capillary fringe as well as the vadose zone, and the DNAPLs may be expected to be trapped within or adjacent depressions 24 in an upper surface 26 of the aquitard 16 below the aquifer A.

As used herein, the term "aquifer" refers generally to a water bearing stratum of permeable rock, sand or gravel, and the term "aquitard" is understood to refer to stratum of low permeability rock or clay. The terminology "LNAPL" as used herein refers to and includes substantially non-water soluble liquid organics having specific gravities less than 1.0, and the term "DNAPL" as used herein refers to and includes substantially non-water soluble liquid organics having specific gravities greater than 1.0.

In accordance with the invention, LNAPLs and optionally DNAPLs are extracted from the formation as by a pair of horizontal extraction wells 28 and 30, respectively. During the removal of organic contaminants from the formation 10, the upper surface 26 of the aquifer is maintained at a desired level which is selected to facilitate the removal of LNAPLs from adjacent the upper surface of the aquifer. As used herein in reference to the aquifer, the term "upper surface" generally refers to the upper surface of the water table in the aquifer, it being understood that the position of the upper surface or water level may naturally experience gradual changes or fluctuations due to seasonal influences and the like.

In a preferred embodiment, LNAPLs and optionally DNAPLs are extracted from the formation through the extractions wells 28 and 30, respectively, and a vacuum is applied to the formation at a location adjacent to and above the upper level of the water table. To this end, the vacuum is preferably applied as a negative pressure supplied to the formation through a horizontal vacuum well 32 located just above the upper surface of the aquifer and substantially vertically aligned with and parallel to the extraction well 28 to impose a lift force on the water table which serves to maintain the upper level of the aquifer at a desired level, wherein the desired level is the level of the upper surface of the water table relative to the LNAPL extraction well as described below.

The removal of LNAPLs from the formation typically includes the removal of water and vapors, including existing organic vapors and vapors resulting from volatilization of organics which occurs during extraction, particularly when vacuum assisted extraction techniques are used. In this regard, the term "vacuum assisted extraction" will be understood to refer to extraction techniques involving the use of an extraction well having a surface vacuum pump with a so-called "drop-tube" extending down into the well casing to the liquid, with a lower end of the drop tube open to the formation below the surface of the aquifer and the upper end connected to a vacuum pump. As will be described below, such extraction techniques may be used in connection with the present invention for the purpose of extracting LNAPLs and optionally DNAPLs. One such system adaptable for use in a horizontal extraction well is described in Blake et al., "Vacuum Enhanced Hydrocarbon Recovery: A Case History" Proceedings of the NWWA Conference on Petroleum Hydrocarbons and Organic Chemicals in Groundwater-Prevention, Detection and restoration (Nov. 12–14, 1986), the disclosure of which is incorporated by reference.

When extracting LNAPLs, the water may be removed at a rate which is greater than the rate that the formation is naturally replenished, so that a relatively sudden drop in the water level occurs at least in the immediate vicinity of the well. This is particularly the case when adjacent formations through which the water must travel have relatively low permeability. The removed water may be treated to remove contaminants and returned to the formation, as by returning the water to a ditch 34 or other accumulation site from which the water may percolate through the soil and return to the aquifer. However, even with the return of the removed water by these methods, removal of water from the aquifer will typically result in excessive fluctuation of the water level so that an excessive amount of LNAPLs smear onto the formation.

The present invention advantageously enables the extraction of LNAPLs from a formation in a manner which avoids excessive smearing of LNAPLs into the formation. As mentioned above a significant feature of the present invention is the application of a lift force to the formation just above the upper surface of the aquifer to maintain the upper surface of the aquifer at a desired level to facilitate removal of LNAPLs and to avoid unnecessary smearing. An additional advantage of the lift force is a "mounding" of the LNAPLs in a mass adjacent the upper surface. In one embodiment of the invention illustrated in FIG. 2, a system for treating a formation 40 includes a relatively permeable water bearing stratum or aquifer 42 overlying a very low permeability aquitard 44. The aquifer 42 includes an upper water saturated zone 46 and a lower unsaturated zone 48. LNAPLs 50 are found as a layer floating on an upper surface 52 of the saturated zone 46 and DNAPLs 54 are found trapped within depressions 56 in an upper surface 58 of the aquitard 44. Test wells may be drilled in advance to map out the formation in terms of the width and depth of the aquifer and aquitard and the type and distribution of organic contaminants within the formation.

Figure 2:
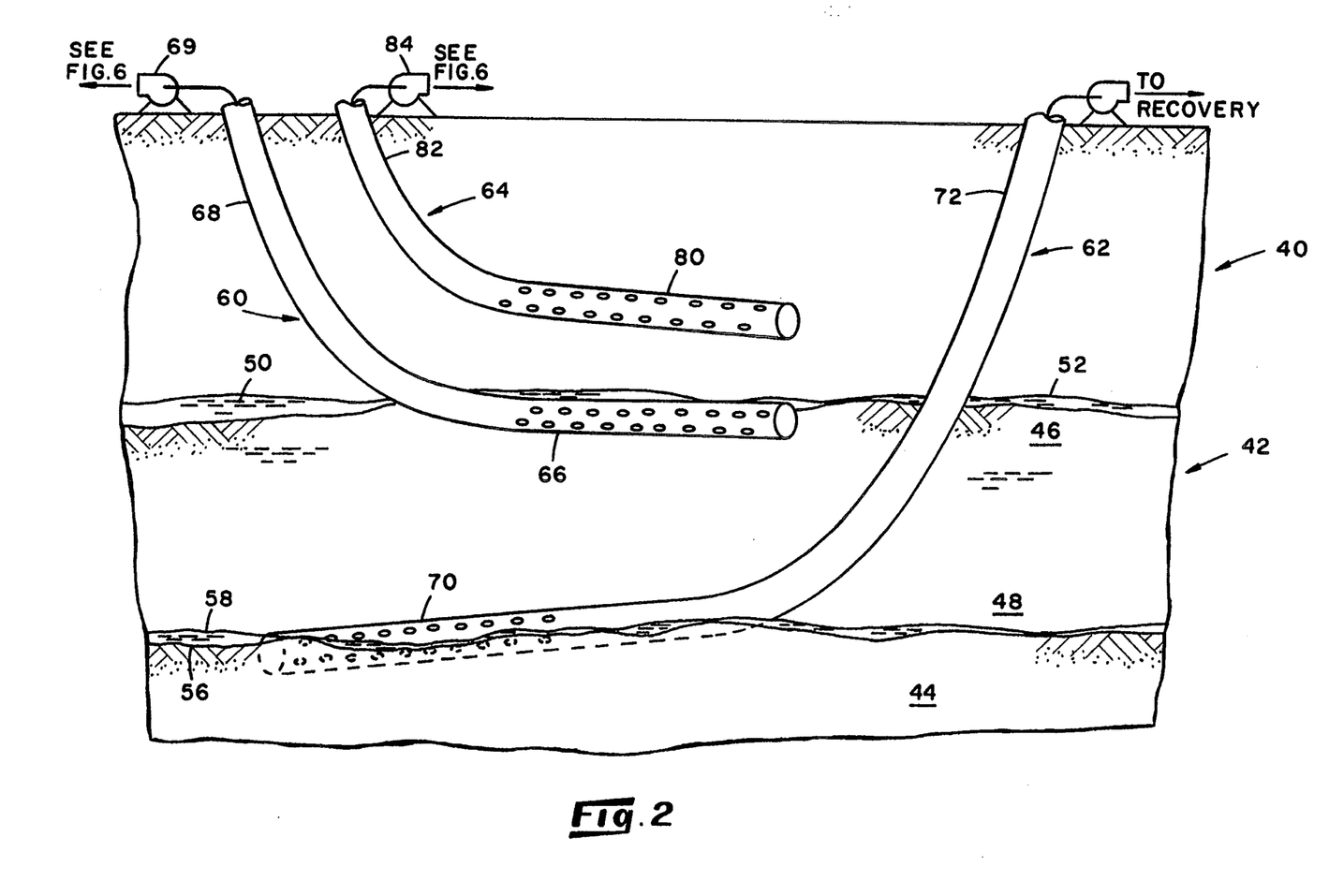
FIG. 2 is a diagrammatic view illustrating additional features of a preferred embodiment of the invention for treating a subterranean formation to remove LNAPLs and DNAPLs.

A horizontally oriented LNAPL extraction well 60 and a horizontally oriented DNAPL extraction well 62 are established down into the formation 40 for extracting LNAPLs and DNAPLs, respectively, and a horizontal vacuum well 64 is established down into the formation to enable a lift force to be applied to the formation adjacent the upper surface of the aquifer.

Extraction well 60 may include a substantially horizontal slotted or perforated wall 66 in fluid communication with the surface through a riser 68 which extends upwardly from the perforated wall 66 to a location above the ground level and is in fluid communication with either a submersible (not shown) or a surface mounted pump 69. Optionally, a drop tube (not shown) connected to a surface mounted vacuum pump may be provided within the well 60 for vacuum-assisted extraction of liquids from the formation, as mentioned previously. Treatment of fluids removed from the well 60 is described below in connection with FIG. 6.

The perforated wall 66 is preferably located in the formation so that the upper surface 52 of aquifer 42 is substantially aligned with centerline C of the perforated wall 66. In a preferred embodiment, the perforated wall 66 is preferably between about 10 and 1000 feet in length, 2-12 inches in diameter. The construction aspects of horizontal wells are well known and suitable constructions are those such as described in the chapter Speake et al., "Modeling The Performance Of A Horizontal Groundwater recovery Well" set forth in the Proceedings of the FIFTH NATIONAL OUTDOOR ACTION CONFERENCE ON AQUIFER RESTORATION, GROUND WATER MONITORING, AND GEOPHYSICAL METHODS (1991) and Karisson "Horizontal Systems Technology for Shallow-Site remediation" (Journal of Petroleum Technology, February 1993), the disclosures of which are incorporated herein by reference. Additional sources for construction aspects of horizontal wells are "Horizontal Environmental Wells" by David D. Wilson (CDM Federal Programs Corp.), Dawn S. Kaback, Ph.D.(Westinghouse Savana River Co.) and Daniel B. Oakley (HAZWRAP, Science and Technology Inc.); Dawn S. Kaback, Brian B. Looney, Carol A. Eddy and Terry C. Hazen (Westinghouse Savana River Co.): "Innovative Ground Water And Soil remediation In Situ Air Stripping Using Horizontal Wells"; and Robert M. Conger and Keith Trichel (BASF Corp./Eastman Christensen Environmental Systems): "A Groundwater Pumping Application For Remediation Of Chlorinated Hydrocarbon Plume With Horizontal Well Technology", the disclosures of which are incorporated herein by reference.

The DNAPL extraction well 62 includes a substantially horizontal perforated wall 70 in fluid communication with the surface through a riser 72 and may contain a submersible pump (not shown) or optional drop tube assembly as described for well 60. The perforated wall 70 is preferably between about 10 and 1000 feet in length, about 2 to 12 inches in diameter and is positioned so that centerline 64 of the perforated wall 70 substantially corresponds to the upper surface 58 of the aquitard 44. Treatment of the removed DNAPLs may be accomplished in a manner which is well known in the art.

Together, the vacuum well 64 and the extraction well 60 enable control over the upper surface 52 of the aquifer 44 to avoid smearing of LNAPLs. To this end, in a preferred embodiment, the vacuum well 64 includes a horizontal perforated wall 80 in flow communication with a riser 82 and vacuum blower 84. The vacuum well 64 is preferably between about 10 and 1000 feet in length, 2-12 inches in diameter and is positioned so that the perforated wall 80 substantially overlies and is parallel to the perforated wall 66 of the extraction well 60. Preferably, the vacuum well 64 is spaced about 18 inches above the perforated wall 66 of the extraction well 60. Soil vapors and other effluent removed from the formation may be treated in the manner described below in connection with FIG. 6.

Use of a horizontal LNAPL extraction well and a horizontal vacuum well is preferred in the practice of the present invention, and it is particularly preferred that the horizontal extraction and vacuum wells are arranged parallel and adjacent one another to enable the wells to cancel out each other. For example, removing liquids from the formation through the horizontal extraction well 60 has an effect on the aquifer which tends to lower the water level. The effect of the extraction well 60 is radially distributed throughout the aquifer and decreases as a function of the radial distance of the location in the formation from the well. The horizontal vacuum well likewise has an effect which is radially distributed throughout the well. However, the effect of the vacuum well tends to increase the flow rate of water into the aquifer so that a lift force is exerted through the formation which tends to raise the water level and to mound the LNAPLs. Accordingly, by monitoring the formation and selecting an extraction rate to provide a desired lowering force and a negative pressure to provide a desired lifting force, the lowering force and the lifting force may be coordinated to maintain the water level at a desired level to enable improved removal of LNAPLs. The vacuum well is therefore preferably positioned in an overlying and parallel relationship with the vacuum well and spaced apart from the well a distance which promotes attenuation of the effects of the extraction well. It will be understood that different arrangements of wells may be used provided that the arrangement provides the described effect.

In operation, the system of the present invention advantageously enables an operator to control the level of the water table so that LNAPLs may be removed from the aquifer without unnecessary smearing. This is accomplished by maintaining the water level at a desired position by supplying a negative pressure to the vacuum well 64 so that a lifting force is exerted through the formation to increase the influx of water into the formation. Depending on the formation, the thickness of the LNAPL layer and other considerations, the desired level may not remain the same during treatment of a formation. For example, if the LNAPL layer is relatively thick, it may be desirable that the desired level is selected so that the water level is a distance above the LNAPL well. However, if the LNAPL is not thick, it may be desirable to maintain the upper level of the water level relative to the LNAPL extraction well so that the centerline of the LNAPL well is substantially aligned with the upper surface of the water table.

The vacuum well and the LNAPL extraction well are preferably operated simultaneously at relatively constant levels to achieve a steady state operation. However, it will be understood that the lift force may be supplied on an as needed basis and in varying amounts to maintain the water level at a desired level. As an example of the flow rates and pressures typically supplied during operation of the system, it has been observed that when liquids are extracted through the well 60 at a rate of between about 3-10 gallons/minute, the preferred vacuum pressure applied by the vacuum well 64 is preferably between about 20 to 60 inches water (gauge). To monitor the level of the aquifer, a plurality of indicators may be located within the formation to monitor various parameters, such as the water level of the aquifer, pressure, thickness of the LNAPL layer and the like.

The application of vacuum to the formation is believed to enable the described control over the water level by exerting a lift force on the upper surface which helps to establish the influx of water into the aquifer at a rate which exceeds the natural influx rate of water into the well and to mound the LNAPLs. This is advantageous to enable production of LNAPLs from the formation without an associated decrease in the water level and to achieve increased production or to account for misplacement of the extraction well or seasonal water level variances.

In addition to this feature, the present invention is also advantageous to enable the extraction of LNAPLs under conditions which avoid the formation of a cone-of-depression. For example, prior art extraction wells of the type having a drop-tube typically extract water and LNAPLs from a formation by applying a negative pressure to the drop tube to pull these fluids from the formation and into an open-end of the drop-tube which is located below the water surface. It has been observed that a cone-of-depression forms along the surface of the aquifer adjacent the lower end of the well during extraction of fluids and that the cone-of-depression becomes progressively steeper or sharper as pumping proceeds, until it reaches a steady state. In addition, because the water level is constantly dropping, such wells can extract fluids only so long as the water level is above the lower end of the well. Once the water level drops past the lower end of the well, only gases are pulled into the well and the water level in the formation must naturally replenish to a location above the lower end of the well before liquids may again be extracted. As will be appreciated, this results in considerable fluctuation of the water table which causes unnecessary smearing and also results in the formation of a cone-of-depression which pulls LNAPLs into the DNAPL contaminated zone of the formation.

To the contrary, the present invention enables the operator to maintain the level of the aquifer and increase production of LNAPLs while avoiding excessive fluctuations and smearing. The present invention also avoids formation of the described cone-of-depression. Accordingly, the present invention enables extraction of organics in a manner which avoids smearing of organics and which avoids formation of a cone-of-depression which causes mixing of LNAPLs and DNAPLs.

Figure 3:
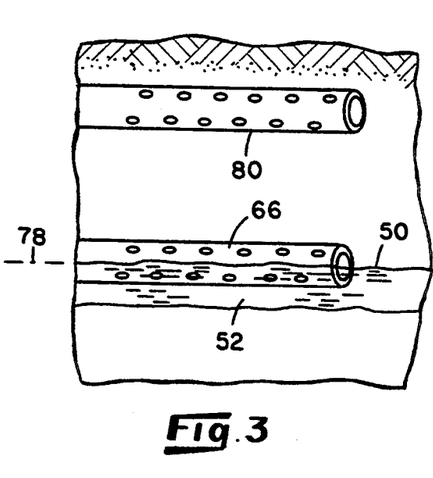
FIG. 3 is a detailed view showing a preferred positioning of the LNAPL extraction well.

The present invention also advantageously enables the recovery of LNAPLs despite inaccuracies which might occur during the drilling of the extraction well or by undesirable location of the extraction well which might occur as a result of seasonal fluctuation of the water level. For example, as mentioned above with regard to FIG. 3, the extraction well 60 is preferably located in the formation so that the centerline 78 of the extraction well is substantially aligned with the upper surface of the aquifer. However, it is often difficult to locate the extraction well at the desired location due to inaccuracies inherent to directional drilling or seasonal variations in the water level.

Figure 4A:
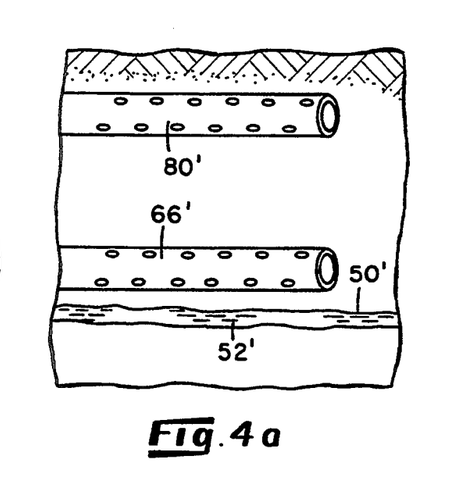
FIGS. 4a, 4b and 4c show an advantage of the present invention wherein the present invention enables an operator to compensate for a mislocation of the LNAPL extraction well to a location which is shallower than desired.

The system of the present invention advantageously enables these inaccuracies and seasonal fluctuations to be compensated for so that organic contaminants may be extracted even though the extraction well may not be placed as desired. For example, with reference to FIGS. 4a, 4b and 4c, there is shown a system which is identical to the system of FIG. 2 except that the location of the extraction well is slightly above the surface of the aquifer instead of aligned with the centerline as may be desired. In this regard it will be understood that in some situations, it may be desired that the extraction well be located a short distance below the water level instead of having its centerline aligned with the water level, such as when a thick layer of LNAPLs is to be removed. The components of the system of FIGS. 4a, 4b and 4c which are substantially identical to the system of FIG. 2 are identified using the same reference character with a prime suffix.

Figure 4B:
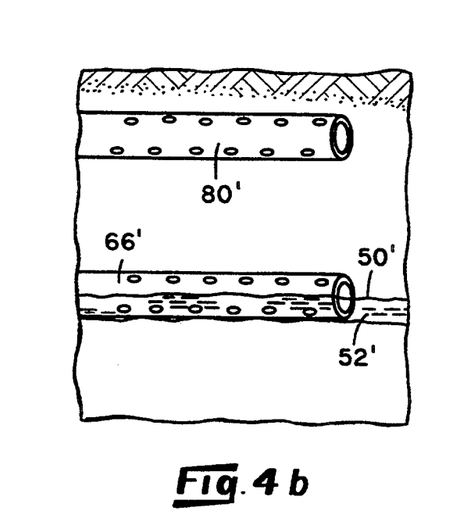
Figure 4C:
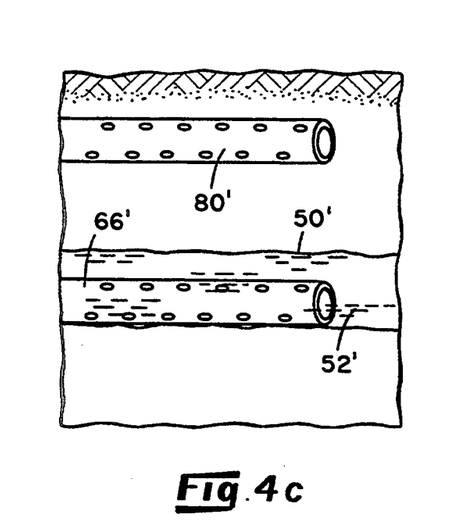
Figure 5A:
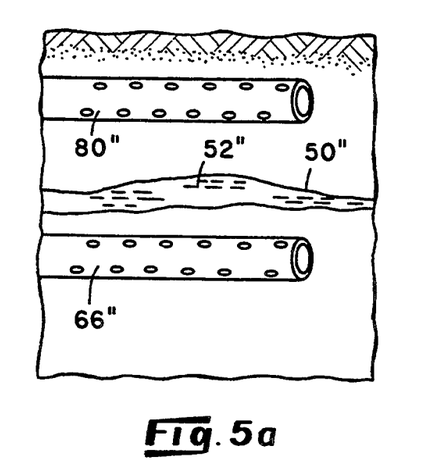
FIGS. 5a, 5b and 5c show an advantage of the present invention wherein the invention enables an operator to compensate for a mislocation of the LNAPL extraction well to a location which is deeper than desired.

The present invention enables the system operator to compensate for this mislocation of the extraction well by enabling the operator to control the level of the aquifer to enhance recovery of LNAPLs or to enable the water level to be adjusted to a desired level to facilitate removal of LNAPLs. With reference to FIG. 4b, applying a vacuum to the formation via the vacuum well will cause a lift force to be exerted through the formation and cause the upper level 52' of the aquifer 42' to rise to a desired level. In this case, the desired level corresponds to a level wherein the upper level 52' of the aquifer substantially corresponds to the centerline of the extraction well 60' (FIG. 4b). Alternatively, the water level may be adjusted so that the extraction level is below the water surface (FIG. 4c), such as when LNAPLs are present as a thick layer on the water surface. In a similar manner, the present invention is also advantageous to enable the operator to compensate for the misplacement of the extraction well at a location that is deeper than desired. For example, with reference to FIGS. 5a, 5b and 5c, there is shown a system wherein the extraction well is placed such that it is further below the layer of LNAPLs than is desired. The components of the system of FIGS. 5a, 5b and 5c which are substantially identical to the system of FIG. 2 are identified using the same reference character with a double prime suffix.

Figure 5B:
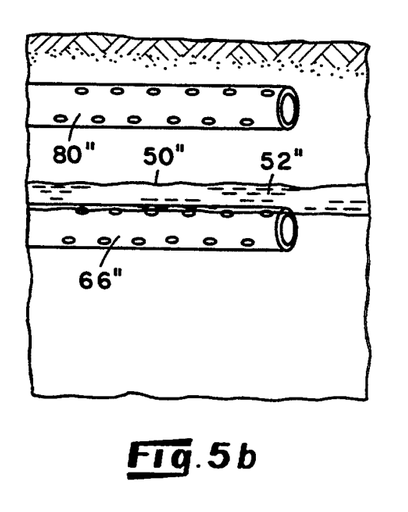
Figure 5C:
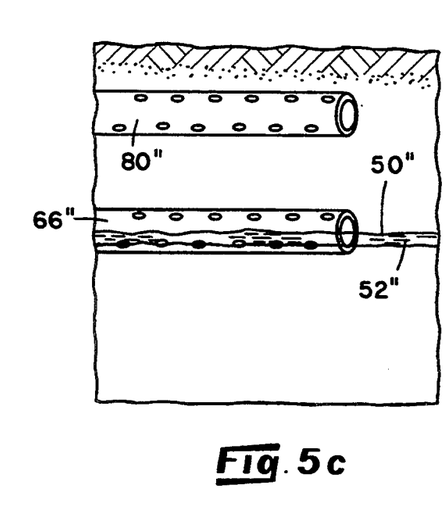

Because the extraction well is deeper than desired (FIG. 5a), the water level may be advantageously lowered to one or more desired levels. This is accomplished by first removing water from the aquifer via the extraction well to lower the upper level of the aquifer. Once the level has been lowered to a desired level wherein the extraction well is just below the upper level of the aquifer, as shown in FIG. 5b, or aligned with the centerline of the extraction well (FIG. 5c), the operator may begin extracting LNAPLs through the extraction well as described previously. The vacuum may be supplied to the formation during extraction of LNAPLs to maintain the water level the respective location and to also increase the production of LNAPLs.

Figure 6:
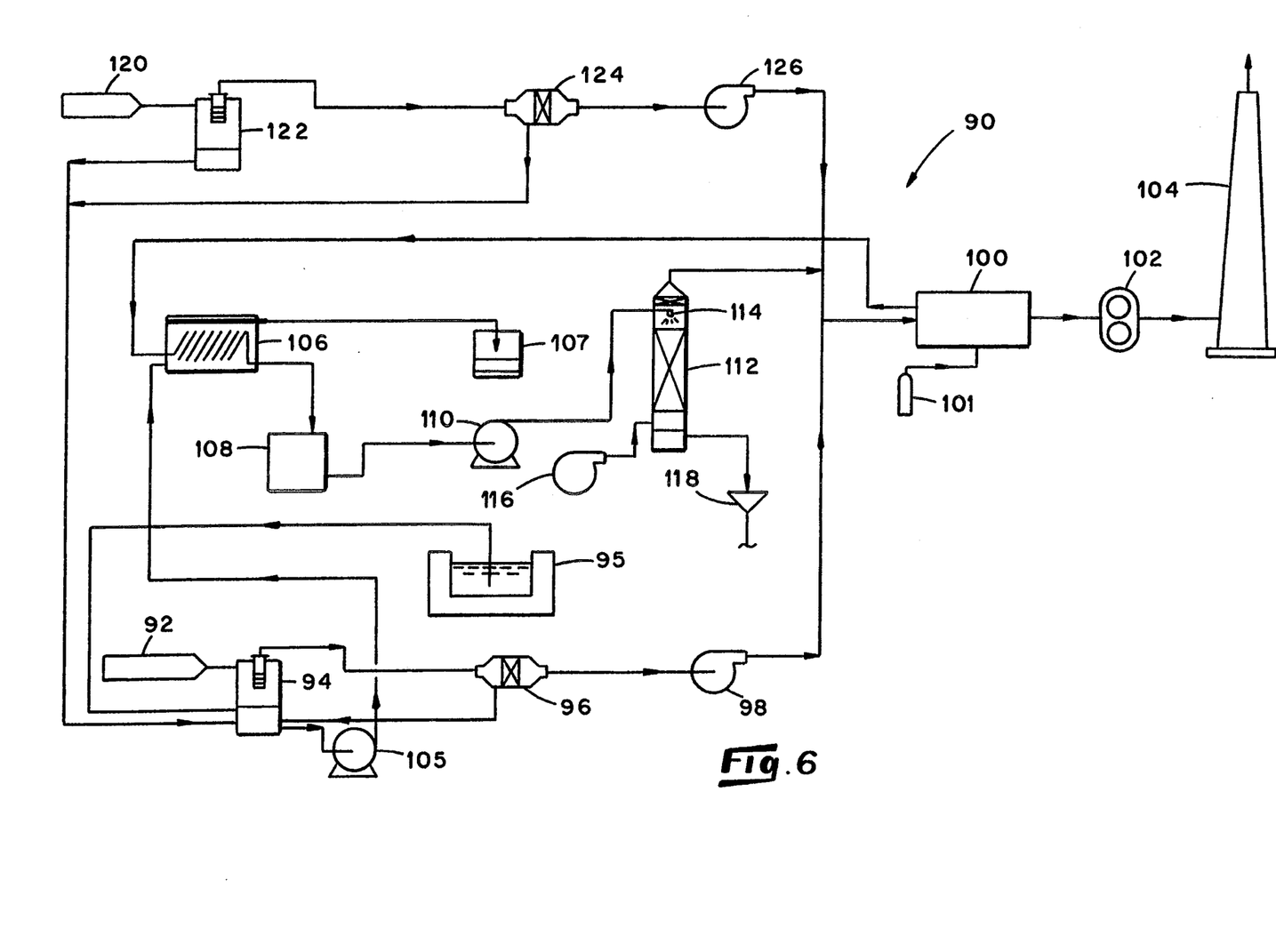
FIG. 6 is a diagrammatic view showing treatment of removed fluids.

Fluids in the form of liquids and gases removed from the formation in accordance with the present invention may be treated prior to recovery or disposal such as by use of a treatment system 90 as shown in FIG. 6. For example, the fluids removed from the formation by the extraction well 60 typically include various soil gases, LNAPLs and water. These fluids are introduced into the system 90 at an inlet 92 and initially conducted by piping into a mist separator 94 to separate gases from liquids. The separator 94 is in fluid communication with a containment sump 95 and the separated gases are directed by piping to a demister 96 to remove moisture from the gases and the dehumidified gases are directed by blower 98 for mixing with other recovered gases, as explained below, and the mixed gases are directed to a cycling adsorber 100 having nitrogen 101 as a sweep gas for adsorbing volatile components. Remaining soil gases may then be directed by a blower 102 to a stack 104 for discharge to atmosphere and any recovered liquids are returned to an oil/water separator 106.

As shown in FIG. 6, the liquids from the demister 96 are returned to the mist separator 94 and the liquids are removed from the separator 94 and mixed with liquids from the vacuum well 64 as described below. The resulting liquid mixture may be directed by a pump 105 to the separator 106 for gravitational separation of organics from water, wherein the organics are primarily LNAPLs which accumulate as a floating layer of organics at the top of the water surface. The organics are skimmed from the top of the separator 106 and directed to a waste tank 107 for storage until transfer to a hydrocarbon recovery facility for further processing.

The liquid at the bottom of the separator 106 is directed to a surge tank 108 and pumped by pump 110 to the top of a stripper 112 for further removal of organics from water. As shown, liquids are introduced by a sprayer 114 into a countercurrent flow of air introduced into the bottom of the stripper 112 by a blower 116. The countercurrent flow of air adsorbs residual hydrocarbons from the spray to further clean the water of hydrocarbons. The hydrocarbon-bearing spray is directed from the top of the stripper and mixed with the gases from the demister 96 and the cleaned water is directed from the bottom of the stripper 112 to sewer 118 for disposal.

Fluids removed from the formation by the vacuum well 64 typically include organic vapors, water vapor and liquids condensed from these vapors. These fluids are preferably introduced into the system 90 at an inlet 120 and initially conducted by piping into a mist separator to separate gases from liquids. The separated gases are directed by piping to a demister 124 to remove moisture from the gases and the dehumidified gases are directed by blower 126 for mixing with gases from the demister 96 and stripper 112. The mixed gases are directed to the purse unit 100 and stack 104 as described above. Liquids from the demister 124 are directed to the surge tank for mixing with fluids derived from the extraction well 62 and the resulting fluid mixture treated as described above.

The present invention advantageously provides a system for treating a subterranean formation having an aquifer contaminated with organics wherein organics are removed from the formation through an extraction well and a negative pressure is supplied to the formation through a vacuum well to cause an influx of water into the formation which is selected so that the water level is maintained at a desired level. As described previously, the maintenance of a desired water level is advantageous to avoid smearing of organics and to provide improved removal of organics. In this regard, it will be further understood that the application of a negative pressure to the upper surface of the aquifer through the formation is also helpful to "mound" organics on the surface for improved removal of organics, wherein the lifting force supplied by the vacuum well tends to cause the organics to accumulate for improved removal. Accordingly, the present invention will be understood to enable improved removal of organics in a manner which helps to avoid disadvantageous aspects of prior art methods and which provides improved results as compared to prior art methods.

The foregoing description of certain embodiments of the present invention has been provided for purposes of illustration only, and it is understood that numerous modifications or alterations may be made without departing from the spirit and scope of the invention as defined in the following claims.

The embodiments described herein are the best mode known to applicant for practicing the invention, but it will be understood that other ways of treating the formation according to the claims are encompassed by the invention.

What is claimed is:

1. A method for treating a subterranean formation including an aquifer having a water table with an upper surface spaced below the ground surface and light non-aqueous phase liquid ("LNAPL") contaminants adjacent the upper surface of the water table, said method comprising the steps of:

providing a liquid removal well within the formation adjacent the upper surface of the water table;

removing at least a portion of the LNAPLs from the formation through the liquid removal well adjacent an extraction location within the formation which is adjacent the upper surface of the water table;

providing a vacuum well at a location within the formation which is above the upper surface of the water table and adjacent to but spaced apart and separate from the removal well; and applying a vacuum to the formation through the vacuum well to cause a lift force to be exerted on the upper surface of the water table to maintain a desired level of the water table in relation to the extraction location for removal by the liquid removal well.

2. The method of claim 1, wherein said step of providing a removal well comprises providing a substantially horizontal well portion in fluid communication with the ground surface and having a centerline oriented substantially parallel to the upper surface and wherein said step of removing LNAPLs comprises applying a removal force to the horizontal well portion to pull water and LNAPLs into the horizontal well portion and out of the formation.

3. The method of claim 1, wherein said step of providing a removal well comprises providing a substantially horizontal well having a centerline oriented substantially parallel to and vertically aligned with the upper surface and wherein said step of removing LNAPLs comprises applying a removal force to the well to pull water and LNAPLs into the well and out of the formation.

4. The method of claim 1, wherein said step of providing a removal well comprises providing a substantially horizontal well having a centerline oriented substantially parallel to and vertically spaced apart from the upper surface and wherein said step of removing LNAPLs comprises applying a removal force to the well to pull water and LNAPLs into the well and out of the formation.

5. The method of claim 1, wherein the step of providing a vacuum well comprises providing a substantially horizontal well at a location within the formation which is spaced apart from the removal well so that the vacuum well is vertically aligned with and substantially overlying the removal well.

6. The method of claim 1, wherein said step of applying a vacuum to the formation comprises applying a sufficient negative pressure to the formation so that the influx of water into the aquifer while the pressure is supplied substantially corresponds to the rate of removal of liquids from the formation through the removal well.

7. A method for treating a subterranean formation including an aquifer having a water level and organic contaminants adjacent the water level of the aquifer, said method comprising the steps of:

removing at least a portion of the organics from a location adjacent the water level of the aquifer to exert a force on the water level which tends to cause the water level to lower; and applying a negative pressure to the formation at a location adjacent to and spaced apart from the location of removal of the organic contaminants to exert a lift force through the formation which tends to cause the water level to rise; and coordinating the removal of organics and the application negative pressure to maintain the water level at a desired level.

8. The method of claim 7, wherein said step of providing a negative pressure comprises providing an elongate section of conduit having a first open end, positioning the elongate section at a location within the formation which is above the water level of the aquifer so that the length of the elongate section is aligned with and substantially parallel to the upper surface of the aquifer and the first open end is positioned at a location in the formation which is above the water level, and supplying negative pressure to a second open end in flow communication with the first open end so that negative pressure is supplied to the formation above the water level of the aquifer.

9. A system for treating a subterranean formation including an aquifer containing water supplied by the natural influx of groundwater into the formation, said aquifer having a water table having an upper surface spaced below the ground surface and organic contaminants adjacent the upper surface of the aquifer, said system comprising:

a removal well within the formation at a location adjacent the upper surface for removing at least a portion of the organic contaminants from the formation;

a vacuum well at a location within the formation which is above the water level and adjacent to but spaced apart and separate from the removal well for supplying a negative pressure through the formation to a location in the formation adjacent the upper surface;

wherein at least a portion of the organics may be removed from the formation through the extraction well and a negative pressure supplied to the formation through the vacuum well to cause an influx of water into the formation which is selected to maintain the water level at a desired level.

10. The system of claim 9, wherein said removal well comprises a substantially horizontal perforated wall in fluid communication with the ground surface and having a centerline oriented substantially parallel to the upper surface and said vacuum well comprises a substantially horizontal perforated wall in fluid communication with an above ground vacuum source and positioned at a location within the formation which is spaced apart from the perforated wall of the removal well so that the perforated wall of the vacuum well is vertically aligned with and substantially overlying the perforated wall of the removal well.

* * * * *